United States Patent [19]

Tanaka et al.

[11] 4,418,347

[45] Nov. 29, 1983

[54] ROTATIONAL POSITION DETECTING APPARATUS

[75] Inventors: Hiroaki Tanaka; Shigeyuki Akita, both of Okazaki, Japan

[73] Assignee: Nippon Soken, Inc., Nishio, Japan

[21] Appl. No.: 318,854

[22] Filed: Nov. 6, 1981

Related U.S. Application Data

[63] Continuation-in-part of Ser. No. 105,118, Dec. 19, 1979, abandoned.

[30] Foreign Application Priority Data

Dec. 27, 1978 [JP] Japan .................................. 53-162707
Nov. 10, 1980 [JP] Japan .................................. 55-157808

[51] Int. Cl.³ ............................................ G08C 19/10
[52] U.S. Cl. ............................ 340/870.37; 324/61 R; 340/347 P
[58] Field of Search ...................... 340/870.37, 347 M; 324/61 R; 318/662

[56] References Cited

U.S. PATENT DOCUMENTS

| | | | |
|---|---|---|---|
| 3,222,668 | 12/1965 | Lippel | 340/870.37 |
| 3,873,916 | 3/1975 | Sterki | 340/870.37 |
| 3,938,113 | 2/1976 | Dobson et al. | 340/870.37 |
| 3,961,318 | 6/1976 | Farrand et al. | 318/662 |
| 4,092,579 | 5/1978 | Weit | 340/870.37 |

Primary Examiner—James J. Groody
Attorney, Agent, or Firm—Cushman, Darby & Cushman

[57] ABSTRACT

A rotational position detecting apparatus suitable for the crank angle sensor of an engine is disclosed. The apparatus comprises a first and a second plate in a manner so that the first plate is placed opposite to the second plate, the first plate including a first and a second toothed electrode and a first and a second circular electrode, the second plate including a third and a fourth toothed electrode and a third and a fourth circular electrode, the first and second toothed electrodes and the first and second circular electrodes being electrically connected with each other, correspondingly and respectively, the third and fourth toothed electrodes and the third and fourth circular electrodes being electrically connected with each other, correspondingly and respectively, a first signal and a second signal having the opposite phase to that of the first signal being applied to the first and second toothed electrodes of the first plate respectively thereby detecting rotational position of the second plate. The apparatus further comprises a compensating capacitor for cancelling the distributed capacity existing between the electrodes of the first plate.

7 Claims, 10 Drawing Figures

ROTATIONAL POSITION DETECTING APPARATUS

This application is a continuation-in-part of our co-pending application Ser. No. 105,118 filed Dec. 19, 1979, now abandoned.

BACKGROUND OF THE INVENTION

1. Field of the Invention

The present invention relates to a rotational position detecting apparatus, or more in particular to a capacitive rotational position detecting apparatus capable of detecting the rotational position of the crank shaft of the automobile or the like without delay regardless of the rotational speed of the rotating member such as the crank shaft.

The U.S. patent application Ser. No. 105,118 filed Dec. 19, 1979 now abandoned and the U.S. patent application Ser. No. 159,855 filed June 16, 1980 now U.S. Pat. No. 4,350,981 by the same applicant are copending applications with the present application.

2. Description of the Prior Art

In a conventional apparatus for detecting the rotational position of the crank shaft or the like of, say, an automobile, a member of a magnetic material wound with a coil is placed opposite to the rotating member so that an alternating electromotive force is induced in the coil by the change of magnetic fluxes caused by the unevenness or projections of the rotating member thereby to detect the rotational position of the rotating member.

The apparatus of this type has the disadvantage that the alternating electromotive force induced in the coil is affected by the change of magnetic fluxes causing the electromotive force, namely, the rotational speed of the rotating member and therefore at low rotational speeds of the rotating member, substantially no alternating electromotive force is generated, thus making it impossible to detect the rotational position of the rotating member.

SUMMARY OF THE INVENTION

It is an object of the present invention to obviate the above-mentioned disadvantage and accordingly to provide a rotational position detecting apparatus which is capable of detecting the rotational position of the rotating member accurately either in the case of the low rotational speed of the rotating member or in the case of the presence of distributed capacity.

In accordance with the present invention, there is provided a rotational position detecting apparatus comprising: a first plate supported in a relation to a rotating member and provided with a first and a second toothed electrode electrically insulated from each other and a first and a second circular electrode electrically insulated from each other, said first and second toothed electrodes having a plurality of equispaced radial teeth respectively and arranged alternately, and said first and second circular electrodes being insulated electrically from said first and second toothed electrodes, said first toothed electrode and first circular electrode being electrically connected with each other and said second toothed electrode and second circular electrode being electrically connected with each other; a second plate rotated by said rotating member and provided with a third and a fourth toothed electrode insulated electrically from each other and a third and a fourth circular electrode insulated electrically from each other, said third and fourth toothed electrodes having a plurality of equispaced radial teeth respectively and arranged alternately in a manner so that said first and second toothed electrodes and said first and second circular electrodes of said first plate can be opposite to said third and fourth toothed electrodes and said third and fourth circular electrodes of said second plate, correspondingly and respectively, said third toothed electrode and third circular electrode being electrically connected with each other, and said fourth toothed electrode and fourth circular electrode being electrically connected with each other; a rotation detecting circuit for detecting rotation of the second plate in accordance with a static capacitance change occurring between the electrodes of the first plate and second plate as one of the plates rotates by supplying said first and second toothed electrodes of said first plate with a first and a second periodic signal respectively which are opposite in phase and same in frequency with each other; and a compensating capacitor for cancelling the distributed capacity existing between the electrodes of said first plate.

DESCRIPTION OF THE PREFERRED EMBODIMENTS

Figure 1A:
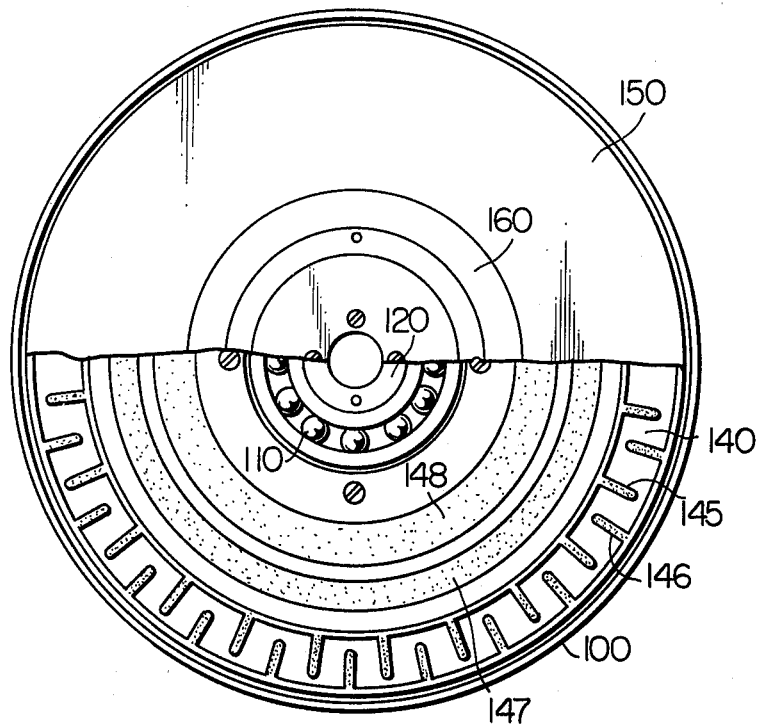
FIGS. 1A and 1B show a cross-sectional view and a longitudinal view respectively of the essential parts of the rotational position detecting apparatus according to an embodiment of the present invention.

The present invention will be described below with reference to the embodiments shown in the drawings. First, the embodiment shown in FIGS. 1 to 5 will be described.

Figure 1B:
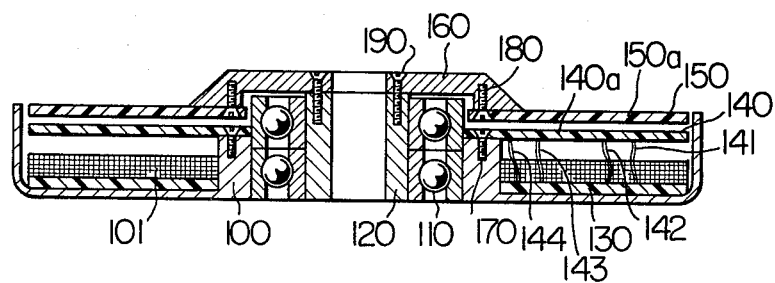

Referring to FIGS. 1A and 1B, reference numeral 100 designates a housing fixed on the outside of a bearing 110, and numeral 120 is a shaft fixed on the inside of the bearing 110, which shaft is coupled to, say, the crank shaft of the engine, so that as the shaft 120 rotates, the rotating member 160 secured to the shaft 120 by the screws 190 rotates. Also, the rotating member 160 fixedly carries, by way of the screws 180, a second plate 150 of a printed board with electrodes printed on the surface 150a, which plate 150 is rotated by the rotation of the rotating member 160. A first plate 140 of a printed board with electrodes printed on the surface 140a, on the other hand, is secured to the housing 100 by screws 170, and is connected with signal lines 141, 142, 143 and 144 from a detector circuit section 101 mounted on the printed board 130 secured to the housing 100.

Figure 2A:
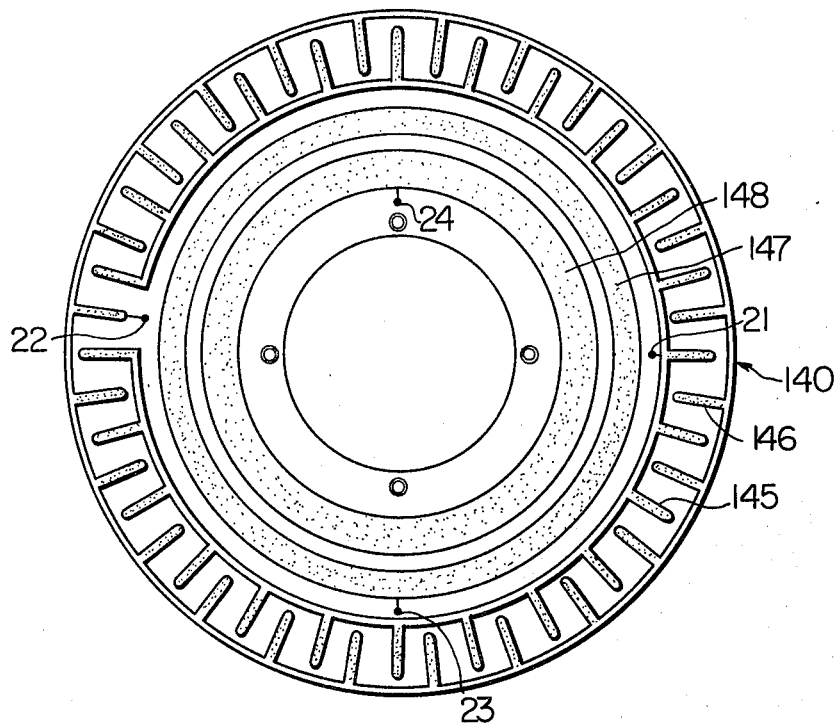
FIGS. 2A and 2B show front views of the first and second plates respectively of the rotational position detecting apparatus according to the present invention.

FIG. 2A shows a front view of the surface 140a of the first plate 140 which is opposite to the second plate 150. The signal lines 141, 142, 143 and 144 are connected to the first toothed electrode 145 having a plurality of equispaced radial teeth, the second toothed electrode 146, the first circular electrode 147 and the second circular electrode 148 of the first plate 140 through the connectors 21, 22, 23 and 24 respectively. The equispaced radial teeth of the first and second toothed electrodes 145 and 146 are alternately engaged with each other in spaced relation with each other along the circumference thereof.

Figure 2B:
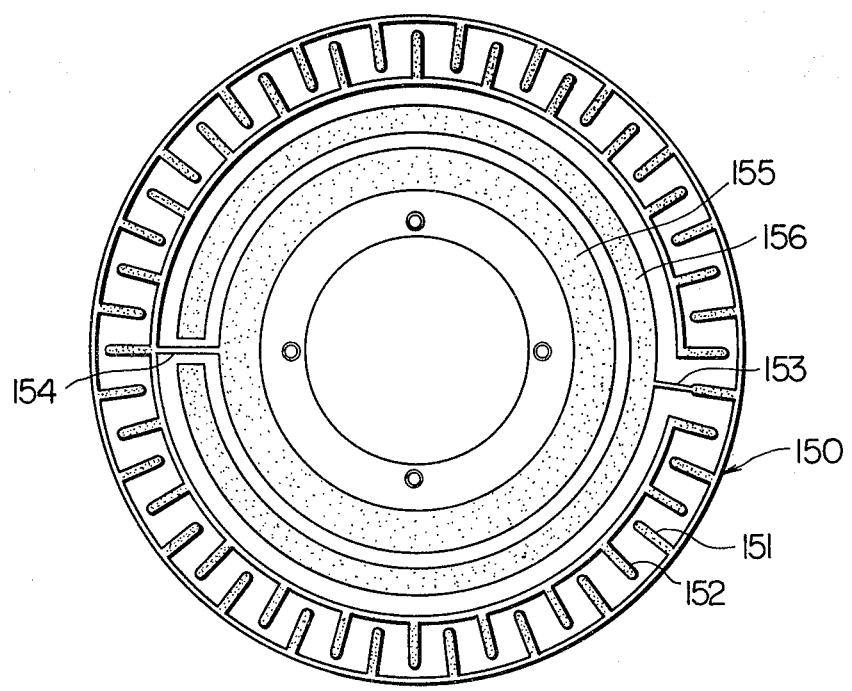

FIG. 2B shows a plan view of the surface 150a of the second plate 150 which is opposite to the first plate 140. The third tooth electrode 151 having a plurality of equispaced radial teeth is connected electrically to the third circular electrode 156 by a lead wire 153, while the second toothed electrode 152 having a plurality of equispaced radial teeth is connected electrically to the fourth circular electrode 155 by a lead wire 154. Similarly to the first plate 140, the third and fourth toothed electrodes 151 and 152 of the second plate 150 are engaged with each other alternately in spaced relation along the circumference thereof. Further, the plates 140 and 150 are printed with the teeth of the toothed electrodes 146 and 151, the teeth of the toothed electrodes 145 and 152, the circular electrodes 147 and 156, and the circular electrodes 148 and 155 in relation opposite to each other, correspondingly and respectively.

Figure 3:
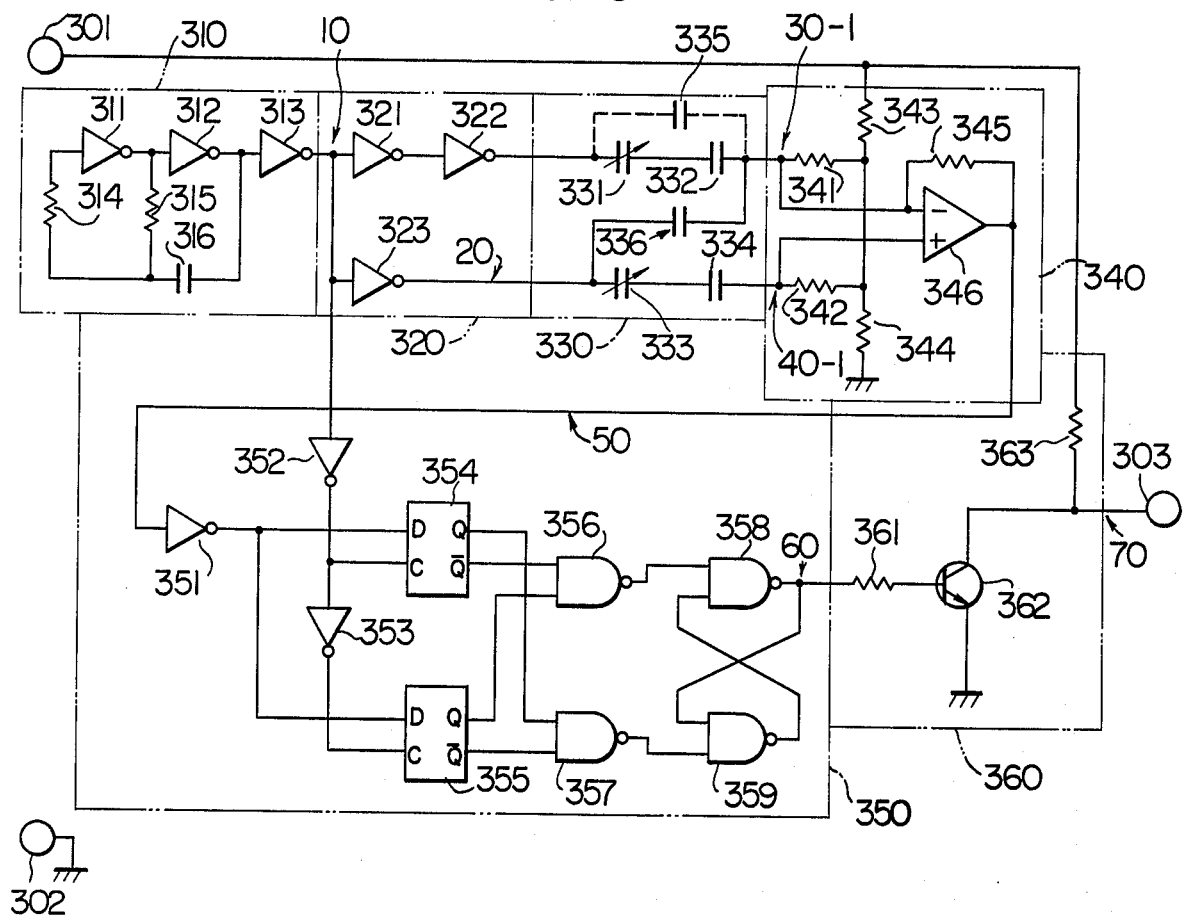
FIG. 3 is an electrical circuit diagram showing an embodiment of the rotation detecting circuit of the rotational position detecting apparatus according to the present invention.

An electric circuit diagram of the detector circuit section 101 is shown in FIG. 3. In FIG. 3, the terminal 301 is a power supply terminal supplied with a constant voltage Vc. The terminal 302 is a grounding terminal. Numeral 310 designates a well-known CR oscillator circuit section, numeral 320 a reference signal generator circuit section, and numeral 330 a detector circuit section including a compensating capacitor 336 and capacitors formed by respective corresponding pairs of the electrodes 151, 152, 156 and 155 of the second plate 150 and the electrodes 146, 145, 147 and 148 of the first plate 140. Numeral 340 designates a comparator circuit section, numeral 350 a phase detector circuit section, numeral 360 an output circuit section, and numeral 303 an output terminal.

The operation of the circuit having the above-described configuration will be described with reference to FIGS. 4A, 4B and 5. In FIG. 3, the oscillation waveform 10 is produced by the CR oscillator circuit section 310 made up of the inverter gates 311, 312 and 313, resistors 314 and 315 and the capacitor 316. This oscillation waveform is applied to the reference signal generator circuit section 320 for producing a signal of the same phase as the oscillation waveform 10 and a signal 20 of the reversed phase as shown in (b) of FIG. 5.

Figure 4A:
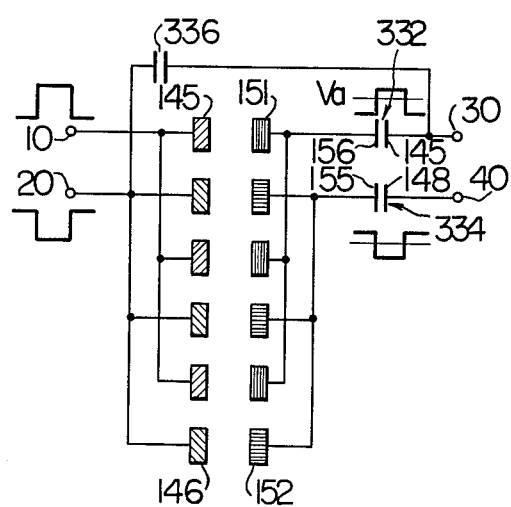
FIGS. 4A and 4B are electrical circuit diagrams for illustrating operation of the rotational position detecting apparatus according to the present invention and also illustrating relative positions of the electrodes with rotation of the rotating member.
Figure 5:
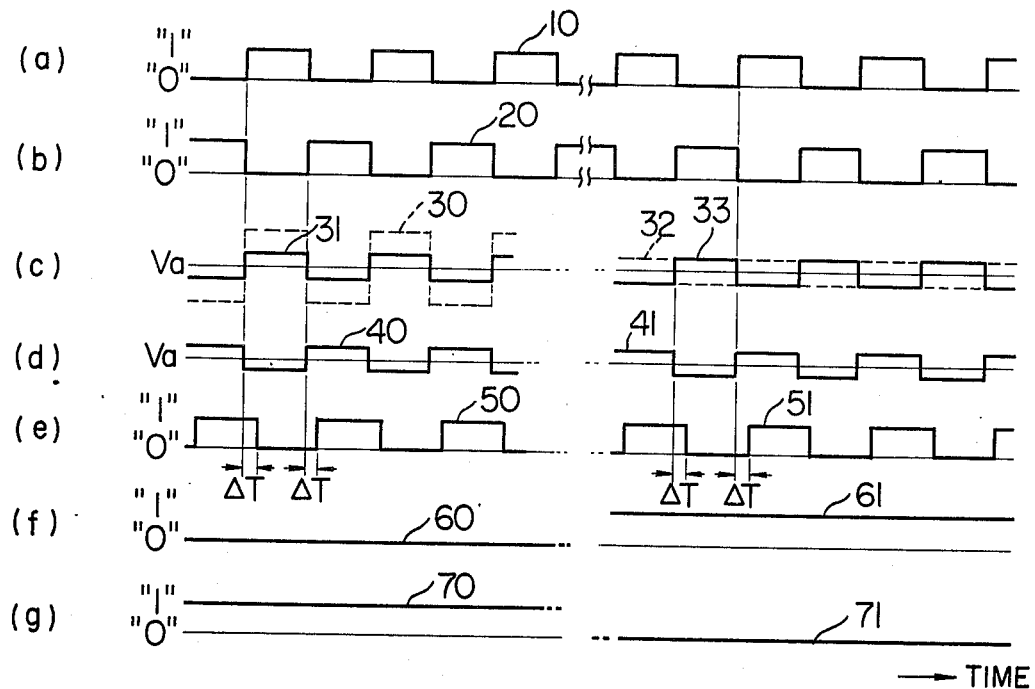
FIGS. 5a–g show signal waveforms appearing at various portions of the circuit of FIG. 3 for illustrating the operation of the embodiment shown in FIG. 3.

As shown in FIG. 4A, assume that the rotation of the shaft 120 (shown in FIG. 1) causes the rotation of the second plate 150, so that the teeth of the third toothed electrode 151 are opposite to the teeth of the first toothed electrode 145 of the first plate, that is, the teeth of the second toothed electrode 152 of the second plate 150 are opposite to the teeth of the second toothed electrode 146 of the first plate 140. When a signal of the same phase as the oscillation waveform 10 is applied through the signal line 141 to the first toothed electrode 145 of the first plate 140, a signal of the same phase as the oscillation waveform 10 is produced on the signal line 53 through the capacitor (331 in FIG. 3) made up of the teeth of the first toothed electrode 145 and the teeth of the first toothed electrode 151 of the second plate 150, which signal is applied to the junction point 30-1 (shown in FIG. 3) of the comparator circuit section 340 through the connector 23 by a capacitor (332 in FIG. 3) made up of the third circular electrode 156 of the second plate 150 and the third circular electrode 147 of the first plate 140. In the absence of the compensating capacitor 336, as shown in FIG. 2, the existence of the distributed capacity (335 in FIG. 3) between the first toothed electrode 145 of the first plate 140 and the third circular electrode 147 thereof causes the waveform (of the same phase as the oscillation waveform) applied to the first tooth electrode 145 of the first plate 140 to be applied through both the capacitor 332 and the distributed capacity 335, so that a superposition of these waveforms is produced at the junction 30-1 (signal 30 in FIG. 5). In similar fashion, the signal 20 transmitted to the second toothed electrode of the first plate 140 through the signal line 142 is produced at the second toothed electrode 152 of the second plate 150 as a signal of the same phase as the signal 20 through the capacitor (333 in FIG. 3) made up of the teeth of the second toothed electrode 146 of the first plate 140 and the teeth of the second toothed electrode 152 of the second plate 150, which signal is applied through the connector 24 to the comparator circuit section 340 as a signal 40 shown in (d) of FIG. 5 through the capacitor (334 in FIG. 3) made up of the fourth circular electrode 155 of the second plate 150 and the second circular electrode 148 of the first plate 140. Nevertheless, the signals 30 and 40 take a waveform based on the voltage Va shown in (c) and (d) of FIG. 5 determined by the resistors 343 and 344 of the comparator circuit section 340. In the embodiment shown in FIG. 3, the signal component 20 which is of the opposite phase to the oscillation waveform 10 is applied to the junction point 30-1 (shown in FIG. 3) through the compensating capacitor 336, so that the waveform shown by signal 31 in (c) of FIG. 5 is produced at the junction 30-1. The signals 31 and 40 are differentially amplified by a differential amplifier made up of the resistor 345 and the operational amplifier 346 of the comparator circuit section 340, thereby producing a signal 50 of the waveform shown in (e) of FIG. 5 which delays by ΔT with respect to the oscillation waveform 10. The delay time ΔT includes the response delay time of the capacitor and the switching delay time of the operational amplifier 346. The signal 50 is waveform-shaped by the inverter gate 351 of the detector circuit section 350 so that a waveform of an opposite phase to the signal 50 is applied to the data terminal of the D-type flip-flops 354 and 355. The clock terminal of the D-type flip-flops 354 and 355, on the other hand, is supplied with signals of the opposite and same phases as the oscillation waveform 10 through the inverter gates 352 and 353, correspondingly and respectively, from the CR oscillation circuit section 310. The edge of the waveform 50 is delayed by time ΔT from the edge of the waveforms 10 and 20, namely, the edge of the clock, so that in response to the rise of the clock, a "1" signal is produced at the output terminal Q of the D-type flip-flop 354 and a "0" signal at the output terminal Q of the D-type flip-flop 356. As a result, the output of the NAND gate 356 becomes "1" and the output of the NAND gate 357 "0". The signal of "0" level shown in (f) of FIG. 5 is produced on the signal line 60 through the flip-flop made up of the NAND gates 358 and 359. This signal is applied to the output circuit section 360, and the transistor 362 is turned off via the resistor 361, thereby producing at the output terminal 303 a signal "1" (signal 70 shown in (g) of FIG. 5) indicative of the fact that the teeth of the first toothed electrode 151 of the second plate 150 are opposite to the teeth of the first toothed electrode 145 of the first plate 140 (that is, the teeth of the second toothed electrode of the second plate 150 are opposite to the teeth of the second toothed electrode 146 of the first plate 140).

Figure 4B:
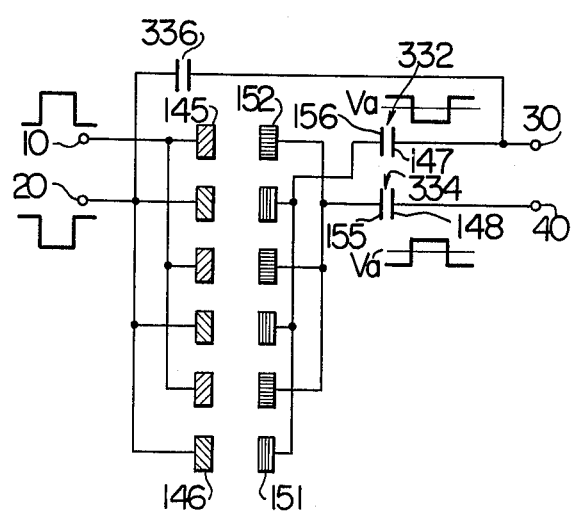

Now, assume that as shown in FIG. 4B, the teeth of the first toothed electrode 151 of the second plate are in relation opposite to the teeth of the second toothed electrode 146 of the first plate 140, and the teeth of the second toothed electrode 152 of the second plate 150 are in relation opposite to the teeth of the first toothed electrode 145 of the first plate 140. A signal of the same phase as the signal 20 is produced at the first toothed electrode 151 of the second plate 150, the waveform 33 shown in (c) of FIG. 5 based on the voltage Va as mentioned above is produced at the first circular electrode 147 of the first plate 140, and a signal of the same phase as the oscillation waveform 10 is produced at the second fourth toothed electrode 152 of the second plate 150. In the absence of the compensating capacitor 336, there exists no distributed capacity 335 between the first toothed electrode 145 of the first plate 140 and the first circular electrode 147 as mentioned above, and therefore the waveform shown in (c) of FIG. 5 and the waveform 32 of the opposite phase thereto (the waveform of the same phase as the oscillation waveform 10) are applied to the junction point 30-1. In an extreme case, the signal at the junction point 30-1 assumes a phase opposite to the waveform 33 as shown by the waveform 32 in (c) of FIG. 5. In the embodiment of FIG. 3, the signal of the opposite phase to the oscillation waveform 10 is applied to the junction point 30-1 through the compensating capacitor 336 thereby to cancel the effect of the distributed capacity 335. In this way, the third circular electrode 147 of the first plate 140 is supplied with the signal 33 shown in (c) of FIG. 5 based on the voltage Va, and the fourth electrode 148 of the first plate 140 is supplied with the signal 41 shown in (d) of FIG. 5 based on the voltage Va. Then a signal 51 as shown in (e) of FIG. 5 is produced at the output terminal of the comparator circuit section 340, and a signal 61 as shown in (f) of FIG. 5 is produced at the output terminal of the detector circuit section 350. Further, the signal "0" (the signal 71 shown in (g) of FIG. 5) indicative of the fact that the teeth of the third toothed electrode 151 of the second plate 150 are in relation opposite to the teeth of the second toothed electrode 146 of the first plate 140 is produced at the output terminal 303.

Thus, when the third toothed electrode 151 and the fourth toothed electrode 152 arranged on the second plate 150 pass over the first toothed electrode 145 and the second toothed electrode 146 arranged on the first plate 140 by the rotation of the shaft 120, a "1" signal and a "0" signal are produced alternately at the output terminal 303, thus making it possible to detect the rotation of the second plate, namely, the rotation of the shaft 120. Further, in the embodiment of FIG. 3, the distributed capacity is corrected by the compensating capacitor 336 and the signal error between the third and fourth toothed electrodes 151 and 152 of the second plate 150 is detected by the comparator circuit section 340, so that the comparator circuit section 340 produces a large output corresponding to the signal error between the third and fourth toothed electrodes 151 and 152, thus detecting the rotation with higher accuracy.

Figure 6A:
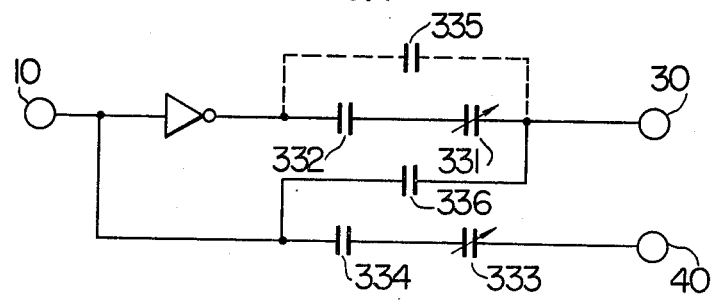
FIGS. 6A and 6B are diagram for illustrating equivalent circuits of the electrodes according to another embodiment of the present invention.

Although the embodiment shown in FIG. 3 is such that the waveform of the same phase as the oscillation waveform is applied through the signal line 141 and the connector 21 to the first toothed electrode 145 of the first plate 140 and the waveform 20 of the opposite phase to the oscillation waveform 10 is applied through the signal line 142 and the connector 22 to the second toothed electrode 146 of the first plate 140, the embodiment under consideration may be alternatively such that the signal waveform of the same phase as the oscillation waveform 10 is applied through the connector 23 (or 24) to the first circular electrode 147 of the first plate 140 (or the second circular electrode 148 of the first plate 140) and the signal 20 is applied through the connector 24 (or 23) to the second circular electrode 148 of the first plate 140 (or the first circular electrode 147 of the first plate 140), followed by the application thereof to the comparator circuit section 340 through the connectors 21 and 22. An equivalent circuit of the electrodes and the compensating capacitor 336 in this case is shown in FIG. 6A.

Figure 6B:
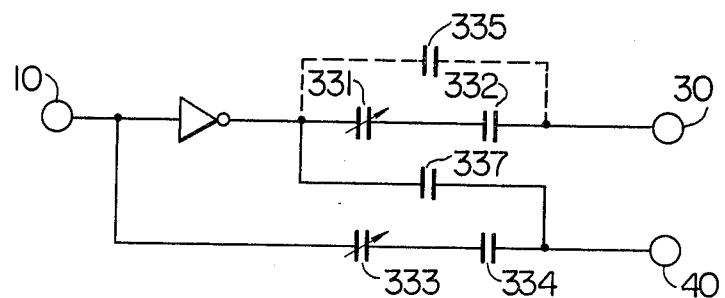

In the embodiment shown in FIG. 3, the signal opposite in phase to the signal transmitted through the distributed capacity 335 is cancelled by the compensating capacitor 336. As an alternative method, as shown in FIG. 6B, a signal of the same phase as the signal transmitted by the distributed capacitor 335 may be cancelled by being applied to the other electrode through the compensating capacitor 337, and these signals may be differentially amplified by the comparator circuit section 340.

As described above, the apparatus according to the present invention comprises the first plate including the first and second toothed electrodes arranged equidistantly along the circumference thereof and first and second circular electrodes, and the second plate including the third and fourth toothed electrodes arranged equidistantly alternately along the circumference thereof in relation opposite to the first and second toothed electrodes of the first plate, and the third and fourth circular electrodes of the second plate in relation opposite to the first and second circular of the first plate so that the rotation of the second plate is converted into the change in static capacitance between the electrodes arranged on the first and second plates.

Further, signals of opposite phases having a predetermined duration are applied to the first and second toothed electrodes (or the first and second circular electrodes) of the first plate from a periodic signal supply circuit, and the signal produced at the third electrode (or the first or second electrode) of the first plate is compensated by the signal of the opposite phase to the first electrode applied to the second electrode of the first plate through the compensating capacitor, by the amount of the signal transmitted through the distributed capacity between the first toothed and first circular electrodes of the first plate. As a result, it is possible to detect the amount of change in the static capacitance, and the signal error between the two electrodes is detected thereby to produce a large output corresponding to the signal error. The phase relation between this signal and the signal from the periodic signal supply circuit is detected from the rotational signal generator circuit thereby to produce a rotation signal. Therefore, the necessity of reduction of the distributed capacitance between the electrodes of the first plate is eliminated, thus making it possible to reduce the size of the plates on the one hand and to accurately detect the rotational position of the rotating member moving at a low speed on the other hand.

We claim:

1. A rotational position detecting apparatus comprising:

a first plate supported in a relation to a rotating member and provided with a first and a second toothed electrode electrically insulated from each other and a first and a second circular electrode electrically insulated from each other, said first and second toothed electrodes having a plurality of equispaced radial teeth respectively and alternately, and, said first toothed electrode and first circular electrode being electrically connected with each other and said second toothed electrode and second circular electrode being electrically connected with each other;

a second plate rotated by said rotating member and provided with a third and a fourth toothed electrode insulated electrically from each other and a third and a fourth circular electrode insulated electrically from each other, said third and fourth toothed electrodes having a plurality of equispaced radial teeth respectively and arranged alternately in a manner so that said first and second toothed electrodes and said first and second circular electrodes of said first plate can be opposite to said third and fourth toothed electrodes and said third and fourth circular electrodes of said second plate, correspondingly and respectively, said third toothed electrode and third circular electrode being electrically connected with each other, and said fourth toothed electrode and fourth circular electrode being electrically connected with each other;

a rotation detecting circuit for detecting rotation of the second plate in accordance with a static capacitance change occuring between the electrodes of the first plate and second plate as one of the plates rotates by supplying said first and second toothed electrodes of said first plate with a first and a second periodic signal respectively which are opposite in phase and same in frequency with each other; and a compensating capacitor for cancelling the distributed capacity existing between the electrodes of said first plate.

2. A rotational position detecting apparatus according to claim 1, wherein said first toothed electrode of said first plate and said third toothed electrode of said second plate constitute a first capacitor, said first circular electrode of said first plate and said third circular electrode of said second plate constitute a second capacitor, said second toothed electrode of said first plate and said fourth toothed electrode of said second plate constitute a third capacitor, and said second circular electrode of said first plate and said fourth circular electrode of said second plate constitute a fourth capacitor, said first and second capacitors being connected in series with each other, and said third and fourth capacitors being connected in series with each other.

3. A rotational position detecting apparatus according to claim 2, wherein said rotation detecting circuit comprises an oscillator circuit section and a comparator circuit section, said comparator circuit section including a first and a second input terminal, a first signal of same phase as an output from said oscillator circuit section being applied to said first input terminal through a first series circuit of said first and second capacitors, a second signal of opposite phase to the output of said oscillator circuit section being applied to said second input terminal through a second series circuit of said third and fourth capacitors.

4. A rotational position detecting apparatus according to claim 3, wherein said compensating capacitor is connected between the first input terminal of said comparator circuit section and the input terminal of said second series circuit, thereby functioning to cancel the distributed capacity existing in parallel to said first series circuit.

5. A rotational position detecting apparatus according to claim 3, wherein said rotation detecting circuit further comprises a reference signal generating circuit section including a plurality of inverters and a detector circuit section including said compensating capacitor, a first signal of the same phase as the oscillation waveform of said oscillator circuit section being applied to the first input terminal of said comparator circuit section through a series connection of two of said inverters and said first series circuit, said compensating capacitor being connected between the input terminal of said second series circuit and the first input terminal of said comparator circuit section and supplying a second signal of the opposite phase to the oscillation waveform of said oscillator circuit section to the first input terminal of said comparator circuit section, thereby to cancel the distributed capacity existing in parallel to said first series circuit.

6. A rotational position detecting apparatus according to claim 5, wherein said first capacitor of said first series circuit is connected between said first input terminal of said comparator circuit section and an end of said second capacitor, and said third capacitor of said second series circuit is connected between the second input terminal of said comparator circuit section and said fourth capacitor.

7. A rotational position detecting apparatus according to claim 5, wherein said second capacitor of said first series circuit is connected between the first input terminal of said comparator circuit section and an end of said first capacitor, and said third capacitor of said second series circuit is connected between the second input terminal of said comparator circuit and an end of said fourth capacitor.

* * * * *